US 011773939B2

(12) United States Patent
Hugenschmidt et al.

(10) Patent No.: US 11,773,939 B2
(45) Date of Patent: Oct. 3, 2023

(54) VIBRATION ABSORBER

(71) Applicant: Vibracoustic AG, Darmstadt (DE)

(72) Inventors: Dominik Hugenschmidt, Bad Bellingen (DE); Tim Fricker, Breisach am Rhein (DE); Thomas Bock, Freiburg (DE)

(73) Assignee: Vibracoustic SE, Darmstadt (DE)

( * ) Notice: Subject to any disclaimer, the term of this patent is extended or adjusted under 35 U.S.C. 154(b) by 0 days.

(21) Appl. No.: 16/797,332

(22) Filed: Feb. 21, 2020

(65) Prior Publication Data

US 2020/0271182 A1 Aug. 27, 2020

(30) Foreign Application Priority Data

Feb. 21, 2019 (DE) .................... 10 2019 104 386.7

(51) Int. Cl.
*F16F 7/10* (2006.01)
*F16F 7/104* (2006.01)
*B60K 5/12* (2006.01)
*F16F 15/08* (2006.01)
*F16F 7/09* (2006.01)

(52) U.S. Cl.
CPC ............ *F16F 7/104* (2013.01); *B60K 5/1208* (2013.01); *F16F 7/09* (2013.01); *F16F 15/08* (2013.01)

(58) Field of Classification Search
CPC .... F16F 7/10; F16F 7/104; F16F 7/108; F16F 15/08; F16F 1/3732; F16F 1/3735
See application file for complete search history.

(56) References Cited

U.S. PATENT DOCUMENTS 3,337,165 A * 8/1967 Kondo .................... F16F 7/104
248/559
5,687,948 A * 11/1997 Whiteford ............. F16F 1/3814
248/635

(Continued)

FOREIGN PATENT DOCUMENTS

DE      19547715 C1 *  5/1997  ............. F16F 7/108
DE      19547715 C1    5/1997

(Continued)

OTHER PUBLICATIONS

Machine translation of JP 53-060462 (no date).*

(Continued)

*Primary Examiner* — Nicholas J Lane
(74) *Attorney, Agent, or Firm* — Fishman Stewart PLLC (57) ABSTRACT

The present invention relates to a vibration absorber (10) for absorbing and/or damping vibrations of a vehicle part, comprising at least one mass element (12), at least one fastening element (14) for fastening the vibration absorber (10) to the vehicle part, at least one spring device (16) and at least one securing device (18) which captively connects the mass element (12) and the fastening element (14) to one another, wherein the spring device (16) is designed as at least one elastomeric shaped part (36) which is manufactured separately from the mass element (12) and the fastening element (14), and wherein the securing device (18) receives the elastomeric shaped part (36) to form at least one elastic mount unit (44) which elastically decouples the mass element (12) from the fastening element (14).

19 Claims, 4 Drawing Sheets

(56) References Cited

U.S. PATENT DOCUMENTS

| | | | | |
|---|---|---|---|---|
| 5,924,670 | A * | 7/1999 | Bailey | F16F 7/1005 248/550 |
| 6,354,575 | B1 * | 3/2002 | Yamashita | F16F 1/3732 188/379 |
| 7,246,797 | B2 * | 7/2007 | Gustavsson | F16F 15/022 267/269 |
| 2004/0040809 | A1 | 3/2004 | Gustavsson | |
| 2004/0124052 | A1 * | 7/2004 | Larmande | F16F 7/108 188/379 |
| 2005/0133325 | A1 * | 6/2005 | Kuwayama | F16F 1/3814 188/379 |
| 2011/0049776 | A1 | 3/2011 | Gustavsson | |
| 2012/0298392 | A1 * | 11/2012 | Weiss | F16F 7/10 173/162.1 |
| 2012/0326369 | A1 * | 12/2012 | Kawachi | B60K 15/067 267/141.4 |
| 2019/0128370 | A1 * | 5/2019 | Manzoor | F16F 15/1442 |
| 2020/0309226 | A1 * | 10/2020 | Durre | F16F 1/3732 |

FOREIGN PATENT DOCUMENTS

| | | | | |
|---|---|---|---|---|
| DE | 102004038023 B4 | | 9/2016 | |
| EP | 3524846 A1 | | 8/2019 | |
| JP | 53060462 A | * | 5/1978 | F16F 7/108 |
| JP | 10030678 A | * | 2/1998 | |

OTHER PUBLICATIONS

Machine translation of DE 19547715 (no date).*
Machine translation of JP 10030678 (no date).*
Chinese Office Action dated Dec. 20, 2022 and Chinese Search Report dated Dec. 13, 2022 for Chinese Patent Application No. 202010103376.0.

* cited by examiner

VIBRATION ABSORBER

The invention refers to a vibration absorber for absorbing and/or damping vibrations of a vehicle part, in particular a part of a motor vehicle, comprising at least one mass element, at least one fastening element for fastening the vibration absorber to the vehicle part, at least one spring device and at least one securing device which captively connects the mass element and the connection element to one another.

Vibration absorbers of the type mentioned above are used to decouple the vibrations transmitted from the engine to a part of the vehicle, such as a gearbox, from the passenger compartment while the vehicle is in motion or in a standstill state, thus increasing travelling comfort. Known vibration absorbers have a spring device and a mass element, the mass element being coupled to the vehicle part to be damped via the spring device in order to be capable of vibrating. When the vehicle part connected to the vibration absorber starts to vibrate, the absorber mass resonates with a certain delay, and the vibrations are damped by the spring device.

Such a vibration absorber is disclosed in DE 195 47 715 C1. The vibration absorber has an absorber mass and a mounting flange which are connected by a spring body made of elastomeric material. In order to prevent detachment of the absorber mass in the event of damage or even destruction of the spring body, the vibration absorber has a securing device which captively secures the absorber mass and the mounting flange to each other. The securing device is essentially T-shaped in cross-section and rigidly connected to the absorber mass, the securing device passing through a recess in each of the spring body and the mounting flange. A plate-shaped end face of the securing device is designed as a stop and is associated at a distance to the side of the mounting flange facing away from the absorber mass.

Furthermore, DE 10 2004 038 023 B4 discloses a vibration absorber for a steering wheel of a motor vehicle, which comprises a gas generator for an airbag as an inertial mass and a spring element of an elastomeric material which is essentially hollow cylindrical or frustoconical in shape and which is connected by its free edges to the gas generator on one side and to the motor vehicle steering wheel on the other side. The gas generator and/or the motor vehicle steering wheel have through-openings in the connection area, which are penetrated and enclosed by the elastomer material of the spring element in order to produce a positive fit with the associated free edge of the spring element.

The present invention had the objective of creating an improved vibration absorber which can be manufactured at low cost.

To solve the objective, a vibration absorber with the features of claim 1 is proposed.

Advantageous embodiments of the vibration absorber are subject of the dependent claims.

A vibration absorber for absorbing and/or damping vibrations of a vehicle part, in particular a motor vehicle part, such as a gearbox, comprises at least one mass element, at least one fastening element for fastening the vibration absorber to the vehicle part, at least one spring device and at least one securing device which captively (or undetachably) connects the mass element and the fastening element to one another, wherein the spring device is designed as at least one elastomeric shaped part (or elastomeric molded part) which is manufactured separately from the mass element and the fastening element, and wherein the securing device receives the elastomeric shaped part in order to form at least one elastic mount unit which elastically decouples the mass element from the fastening element.

The use of an elastomeric shaped part manufactured separately from the mass element and the fastening element means that there is no need to coat the mass element and/or the fastening element with a binder. In addition, the elastic mount unit formed by the elastomer shaped part and the securing device enables a mechanical flow of forces where a chemical bond was previously used. This reduces the manufacturing costs of the vibration absorber and eliminates the need to preheat the mass element, which is necessary for vulcanizing an elastomeric spring device. In addition, the vibration absorber may be expanded modularly, since several elastic mount units can be used independently of the contour of the mass element and/or the fastening element. Thus, the use of the elastic mount unit or several elastic mount units opens up a modular solution so that differently contoured mass elements and/or heavy of different weight can be used. In addition, the securing device combines the function of the loss prevention as well as an elastic mounting, so that the number of parts and thus the costs of the vibration absorber are reduced.

The elastic mount unit decouples the vibrations transmitted from the fastening element to the mass element by means of the elastomer shaped part damping the vibrations entered into the vibration absorber. For this purpose, the elastomeric shaped part is arranged between the fastening element and the mass element. Advantageously, the securing device receives (takes up) the elastomeric shaped part in such a way that the elastomeric shaped part abuts against the fastening element and the mass element in a form-locking and/or force-locking manner (or in a positive and/or non-positive manner). Further advantageously, the securing device fixes the elastomeric shaped part form-lockingly and/or force-lockingly to the mass element and/or the fastening element.

In addition, several elastic mount units may be used. Advantageously, several elastic mount units are used depending on the contour of the mass element, the fastening element and/or the vibrations to be absorbed and/or damped. For example, the vibration absorber can have three or four elastic mount units. If several elastic mount units are used to mount the mass element to the mounting element, they may be arranged at equal distances from each other, or the mount units may be arranged at different distances from each other.

Furthermore, it is also conceivable that the securing device accommodates two or more elastomeric shaped parts. If more than one elastic mount unit is used, each securing device may hold the same number of elastomeric shaped parts, or each securing device may hold a different number of elastomeric shaped parts. This allows different elastic mount units to be combined with each other.

Advantageously, the fastening element has at least one fastening device for attachment to a vehicle part or for being attached to the vehicle part. In an advantageous embodiment, the fastening element is made of metal. Further advantageously, the mass element is made of metal. In an advantageous embodiment, the mass element may be cylindrical. In addition, the mass element may have a different contour, such as a polygon-shaped contour.

The vibration absorber can be used, for example, to absorb and/or damp a gearbox, tailgate or chassis. A vibration absorber used for absorbing and/or damping the vibrations of a gearbox may also be referred to as a gearbox absorber.

In an advantageous embodiment, the mass element and/or the fastening element has at least one recess into which the elastomeric shaped part is inserted in a form-locking manner. In addition, the mass element and/or the fastening element may have several recesses into which the elastomeric shaped parts fit in a form-locking manner.

In an advantageous embodiment, the securing device pretensions or preloads the elastomeric shaped part during assembly with the mass element. This allows the damping characteristics of the vibration absorber to be adjusted by means of the securing device. In this way, the elastomeric shaped part can be compressed and thus pretensioned or preloaded by attaching the securing device to the mass element. Advantageously, the elastomeric shaped part is positioned between the securing device and the mass element so that the securing device pretensions or preloads the elastomeric shaped part during assembly or when connecting it to the mass element.

In an advantageous embodiment, the elastomeric shaped part is connected in a form-locking and/or force-locking manner to the securing device, the mass element and/or the fastening element. In this way, the elastomeric shaped part can be connected to the securing device, the mass element and/or the fastening element in a simple and cost-effective manner. The elastomeric shaped part may have a circumferential groove into which the fastening element is inserted in a form-locking and/or force-locking manner. The elastomeric shaped part is attached to the mass element by means of the securing device in such a way that the elastomeric shaped part abuts in a form-locking and/or force-locking manner.

In an advantageous embodiment, the elastomeric shaped part is ring-shaped. As a result, the elastomeric shaped part has a small component size. Due to the small component size, the number of cavities of the vulcanization tool can be increased, resulting in an increased output per cavity and thus in a reduction of manufacturing costs. In addition, the elastomeric shaped part may also have a polygonal shape. Advantageously, the elastomeric shaped part has an annular section or annular body.

Advantageously, the elastomeric shaped part has a passage through which the securing device extends. For example, the securing device may have a projection, a bolt section or a pin section extending through the passage. Furthermore, the projection, the bolt section or the pin section is inserted in a form-locking and/or force-locking manner into the passage. Advantageously, the projection, the bolt section or the pin section has an outer diameter that is larger than an inner diameter of the passage.

In an advantageous embodiment, the elastomeric shaped part has a circumferential edge section or a circumferentially extending edge section which is inserted into an opening of the fastening element in a form-locking and/or force-locking manner. This creates a simple mounting of the elastomeric shaped part to the fastening element. Advantageously, the edge section has an outer diameter that is larger than an inner diameter of the opening. Further advantageously, the edge section surrounds the passage of the elastomeric shaped part. Further advantageously, the elastomeric shaped part, in particular the annular body of the elastomeric shaped part, abuts against the fastening element.

In an advantageous embodiment, the elastic mount unit has two elastomeric shaped parts between which the fastening element is located. This creates a modular extension of the vibration absorber, since a modular distribution of the mount elements can be generated independently of the contour of the mass element and the mounting element. Advantageously, each elastomeric shaped part has a circumferential edge section which is inserted into the opening of the fastening element in a form-locking and/or force-locking manner. Advantageously, the two edge sections of the elastomeric shaped parts may be in contact within the opening of the fastening element or may be spaced apart. Further advantageously, one elastomeric shaped part, in particular the annular body, rests on the side of the fastening element facing away from the mass element, and the other elastomeric shaped part, in particular the annular body, rests on the side of the fastening element facing towards the mass element. As a result, the two elastomeric shaped parts enclose the fastening element.

In an advantageous embodiment, the securing device is designed as a bolt which, together with the elastomeric shaped part, extends through an opening in the fastening element, the bolt being connected to the mass element in a form-locking and/or force-locking manner. Thus the bolt assumes both the function of loss prevention and the function of an elastic mount. Advantageously, the bolt has a first section with a first diameter and a second section with a second diameter, the first diameter being larger than the second diameter. Further advantageously, the first section having the first diameter extends through the passage of the elastomeric shaped part, the first section being connected in a form-locking and/or force-locking manner to the elastomeric shaped part. Advantageously, the first section forms the projection, the bolt section or the pin section. Further advantageously, the first section accommodates two elastomeric shaped parts in a form-locking and/or force-locking manner by extending through the passages of the elastomeric shaped parts. Further advantageously, the second section is connected to the mass element in a form-locking and/or force-locking manner. Thus the second section can be pressed or screwed into a hole drilled in the mass element.

In an advantageous embodiment, the securing device has a collar which rests on the spring device and is formed as a stop on the fastening element. As a result, the securing device is T-shaped in cross-section. Advantageously, the collar abuts against the elastomeric shaped part, which abuts against the side of the fastening element facing away from the mass element. In the event of damage or even destruction of the elastomeric shaped part(s), the collar, being formed as a stop, thus prevents the mass element from detaching from the vibration absorber, as the collar abuts against the fastening element. Advantageously, the outer diameter of the collar is larger than the inner diameter of the opening of the fastening element so that it is prevented from falling through the opening of the fastening element.

In an advantageous embodiment, the bolt is provided with an external thread which is screwed into an internal thread of the mass element, or the bolt is provided with a profiling which is inserted into a hole of the mass element. This allows the elastic mount unit to be connected to the mass element in a simple and cost-effective manner. Thus the external thread of the bolt can be screwed into the internal thread of the mass element. The profiling reinforces the form-locking and/or force-locking connection between the bolt and the mass element. In an advantageous embodiment, the profiling is formed as knurling. Advantageously, the second section of the bolt has the external thread or profiling.

In an advantageous embodiment, the fastening element is designed as a retaining plate. A retaining plate can be manufactured easily and cost-effectively. Advantageously, the retaining plate is provided with openings through which fastening elements, for example screws, can be passed and screwed to a vehicle part.

In the following, vibration absorbers as well as other features and advantages are explained in detail by means of exemplary embodiments, which are shown schematically in the figures. Thereby.

Figure 1:
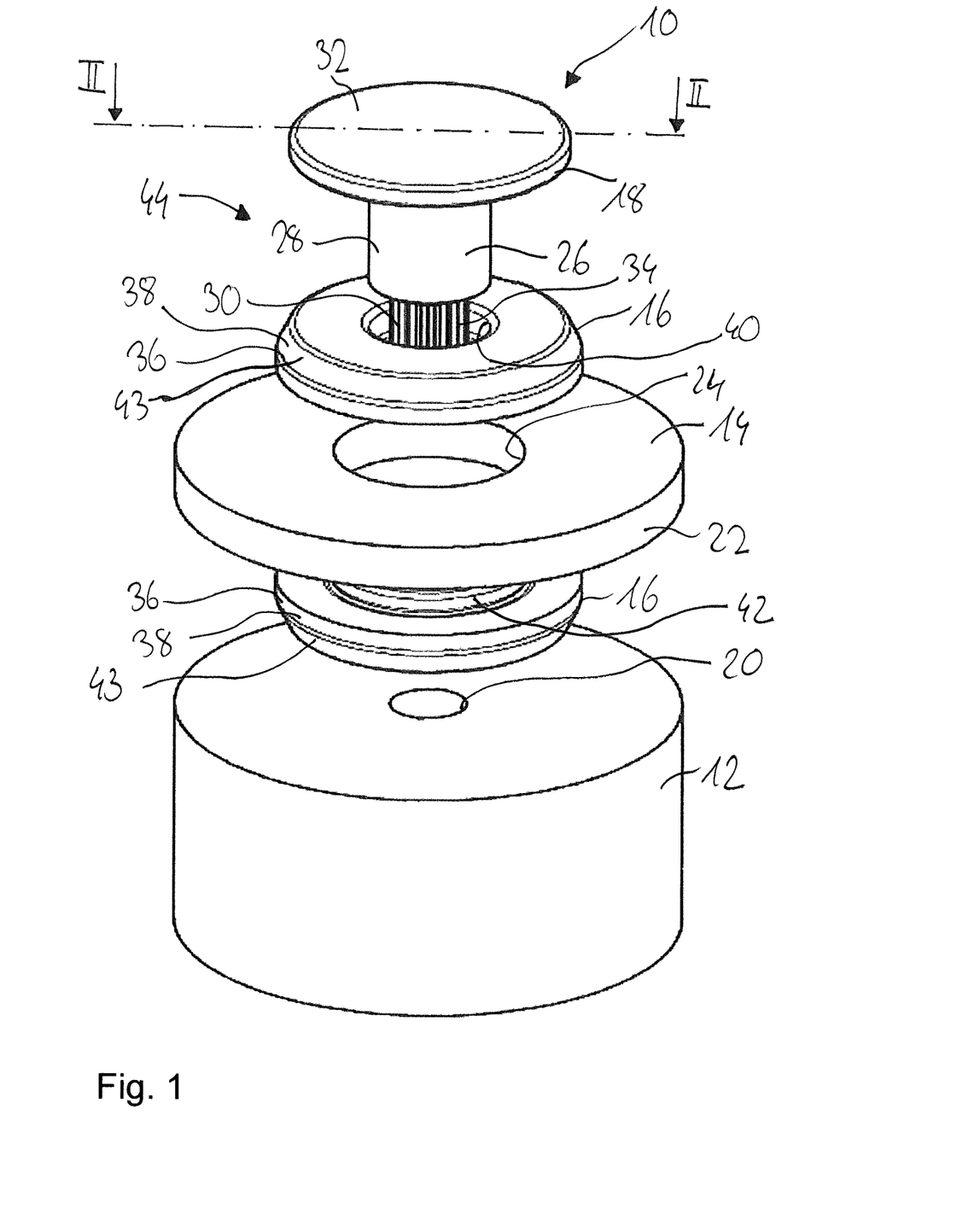
FIG. 1 shows a perspective view of a vibration absorber according to a first embodiment in an unassembled condition.
Figure 2:
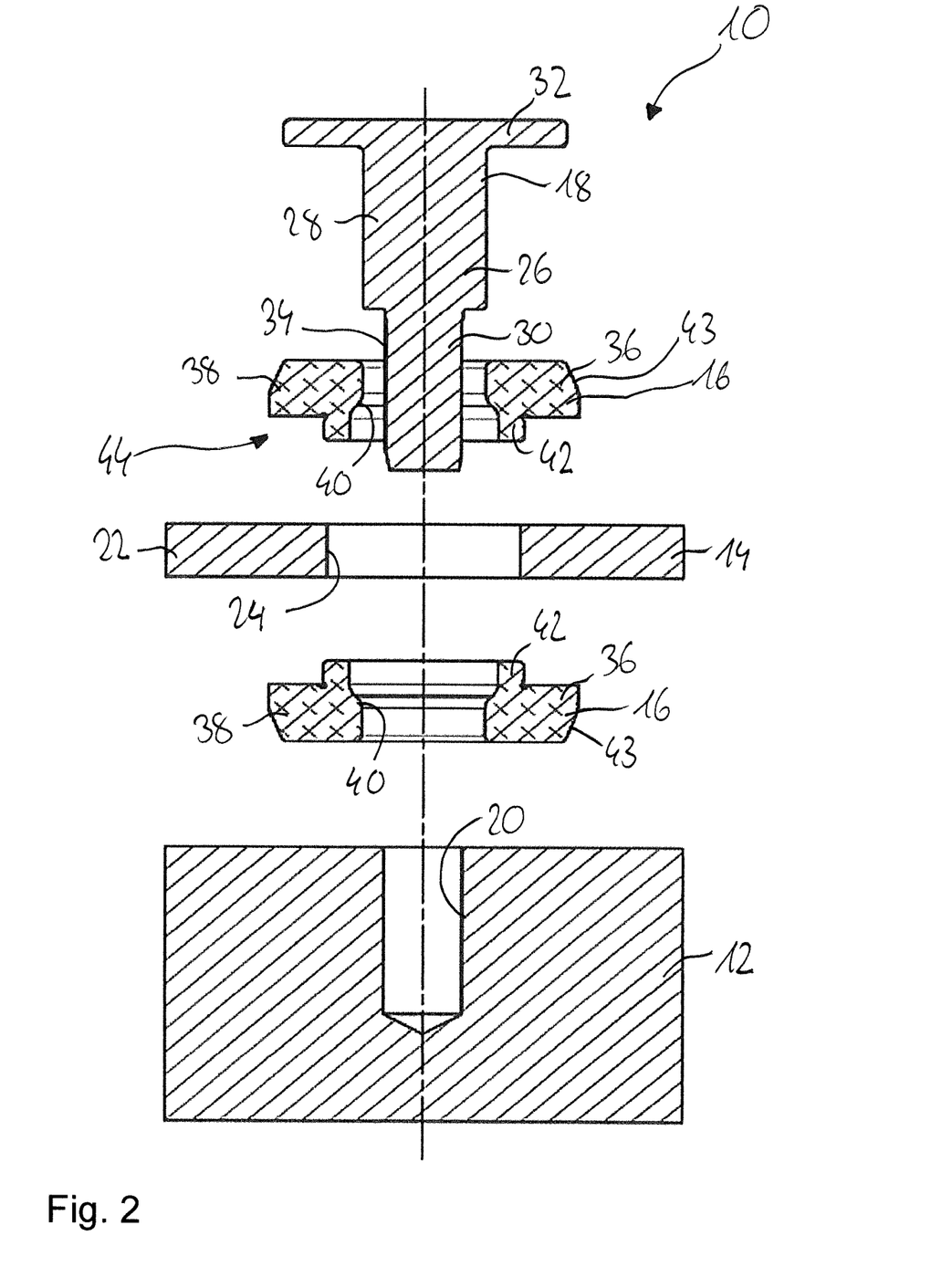
FIG. 2 shows a cross section through the components of the vibration absorber shown in FIG. 1 along line II-II.
Figure 3:
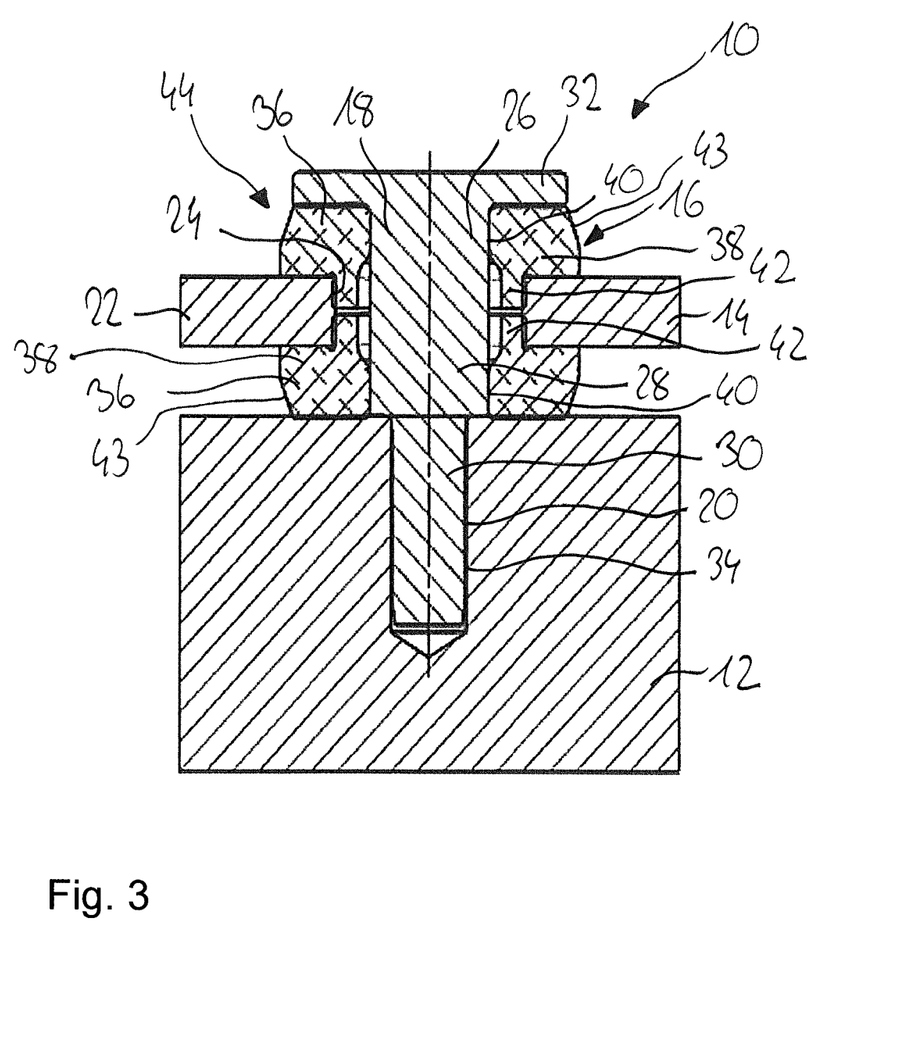
FIG. 3 shows a cross-section through the vibration absorber according to the first embodiment in the assembled state.

FIGS. 1 to 3 show a vibration absorber 10 according to a first embodiment, which serves to absorb and/or damp the vibrations of a part of a vehicle not shown, in particular a transmission not shown.

The vibration absorber 10 has a mass element 12, a fastening element 14 for fastening the vibration absorber 10 to the part of the vehicle not shown, at least one spring device 16 made of elastomeric material and at least one securing device 18 which captively connects the mass element 12 and the fastening element 14 to one another.

The mass element 12 is made of metal and is cylindrical in shape. In the mass element 12, a hole 20 is drilled approximately in the middle, as can be seen in FIGS. 1 to 3.

The fastening element 14 is designed as an annular retaining plate 22 and has a central opening 24.

The securing device 18 is designed as a bolt 26, which has a first section 28 with a first diameter and a second section 30 with a second diameter. As can be seen in particular in FIGS. 2 and 3, the first diameter is larger than the second diameter.

At its end face, the first section 28 is provided with a collar 32, the outer diameter of which is larger than an inner diameter of the opening 24 of the retaining plate 22. The second section 30 is inserted into the hole 20 of the mass element 12 in order to connect the mass element 12 captively with the fastening element 14. For this purpose, the bolt 26 extends through the opening 24 of the retaining plate 22, so that the collar 32 is opposite the side of the fastening element 14 facing away from the mass element 12. In order to increase the form-locking and/or force-locking connection between the bolt 26 and the mass element 12, the second section 30 is provided with a profiling 34, which in this case is designed as a knurling.

Since the outer diameter of the collar 32 is larger than the opening 24 of the retaining plate 22, in case of damage or even destruction of the spring device 16, the collar 32 will abut against the retaining plate 22 so that a detachment of the mass element 12 from the vibration absorber 10 is prevented.

The spring device 16 has two elastomeric shaped parts 36 manufactured separately from the mass element 12 and the mounting element 14. Each of the elastomeric shaped parts 36 is annular in shape and has an annular body 38 with a passage 40 surrounded by a protruding circumferential edge section 42. The annular body 38 is also provided with a bevel 43 on the outer circumference.

As can be seen in particular in FIGS. 2 and 3, the passage 40 has a first inner diameter in the region of the annular body 38 and a second inner diameter in the region of the circumferential edge section 42, the second inner diameter being larger than the first inner diameter. The first inner diameter of the annular body 38 is smaller than the first diameter of the first section 28, so that the bolt 26 can receive the elastomeric shaped part 36 in a form-locking and/or force-locking manner or extend therethrough. Since the second inner diameter is larger than the first diameter of the first section 28, the circumferential edge section 42 is spaced from the bolt 26.

As can be seen in FIG. 2, an outer diameter of the circumferential edge section 42 is larger than the inner diameter of the opening 24. That is why the circumferential edge section 42 can be inserted or tied into the opening 24 of the retaining plate 22 in a form-locking and/or force-locking manner.

In the assembled state shown in FIG. 3, the bolt 36 and the elastomeric shaped parts 36 received in a form-locking and/or force-locking manner by the bolt 36 form an elastic mount unit 44 which elastically decouples the mass element 12 from the fastening element 14. For this purpose, the vibrations generated by the motor vehicle part are entered into the vibration absorber 10 via the fastening element 14. As a result, the mass element 12 starts to oscillate and the elastomeric shaped parts 36 damp the oscillations.

In the following, a possibility for mounting the vibration absorber 10 is explained. As can be seen in FIGS. 1 and 2, the retaining plate 22 is placed between the two elastomeric shaped parts 36. Then each of the elastomeric shaped parts 36 is inserted into the opening 24 by means of its circumferential edge section 42, so that the annular bodies 38 abut against the retaining plate 22. Then the bolt 26 is inserted, in particular pressed, into the passages 40 of the elastomeric shaped parts 36. Then the second section 30 with the profiling 34 is inserted, in particular pressed, into the hole 20 of the mass element 12 so that the collar 32 abuts against the elastomeric shaped part 36, in particular its annular body 38, and the elastomeric shaped parts 36 are thereby compressed and thus preloaded. This allows the damping characteristics of the vibration absorber 10 to be adjusted.

In the following a further exemplary embodiment of the vibration absorber 10 is described. The same reference signs are used for identical or functionally identical parts.

Figure 4:
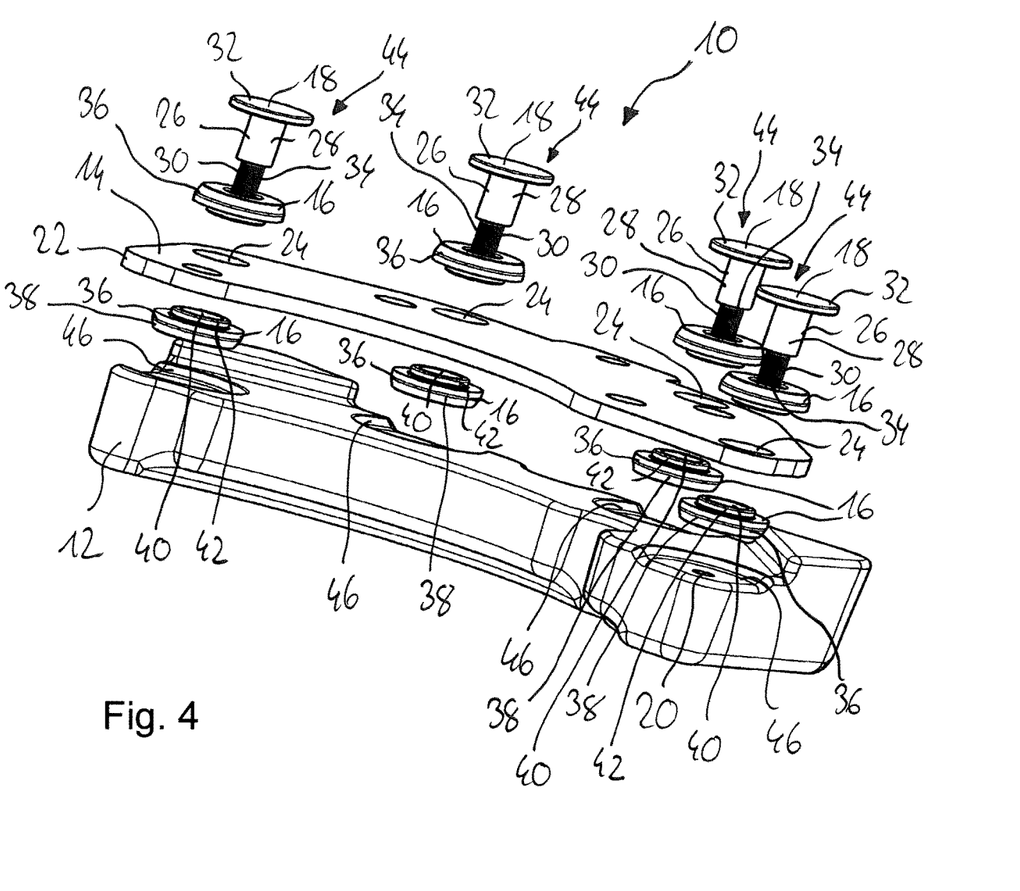
FIG. 4 shows a perspective view of a vibration absorber according to a second embodiment in an unassembled condition.

FIG. 4 shows a second version of the vibration absorber 10, which differs from the first embodiment in the contours of the mass element 12 and the fastening element 14 as well as in the use of four elastic mount units 44.

As can be seen in FIG. 4, each elastic mount unit 44 has a bolt 26 and two elastomeric shaped parts 36, wherein the elastomeric shaped parts 36 facing the mass element 12 can be inserted in a positive manner into recesses 46 of the mass element 12. Within each recess 46, a hole 20 is drilled. The bolts 26 are mounted to the mass element 12 as described above by inserting the second section 30 by means of its profiling 34 into the respective hole 20.

The vibration absorber 10 is characterised by the use of the elastomeric shaped parts 36 which are manufactured separately from the mass element 12 and the fastening element 14. This means that there is no need to coat the mass element 12 and the fastening element 14 with a binder. In addition, the elastic mount unit 44 formed from the elastomeric shaped parts 36 and the bolt 26 enables a mechanical flow of force where previously a chemical bond was used. This reduces the manufacturing costs of the vibration damper 10 and eliminates the need to preheat the mass element 12, which is necessary for scorching an elastomeric spring device. In addition, the vibration absorber 10 can be expanded modularly, since several elastic mount units 44 can be used independently of the contour of the mass element 12 and/or the fastening element 14. The use of the elastic mount unit 44 or several elastic mount units 44 thus opens up a modular solution, so that differently contoured and/or heavy mass elements 12 can be used. In addition, the securing device 18 combines the function of loss prevention and on an elastic mounting, so that the number of parts and thus the costs of the vibration absorber 10 are reduced.

LIST OF REFERENCE SIGNS

10 vibration absorber
12 mass element
14 fastening element
16 spring device
18 securing device
20 hole
22 retainer plate
24 opening
26 bolt
28 first section
30 second section
32 collar
34 profiling
36 elastomeric shaped part
38 annular body
40 passage
42 circumferential edge section
43 bevel
44 elastic mount unit
46 recess

The invention claimed is:

1. A vibration absorber for absorbing and/or damping vibrations of a vehicle part, comprising: at least one mass element, at least one fastening element for fastening the vibration absorber to the vehicle part, at least one spring device and a first securing device which captively connects the mass element and the fastening element to one another, wherein the spring device comprises two elastomeric shaped parts manufactured separately from the mass element and the fastening element; wherein the first securing device receives the elastomeric shaped parts to form a first elastic mount unit which elastically decouples the mass element from the fastening element; wherein the first securing device comprises a bolt which extends together with the elastomeric shaped parts through an opening of the fastening element, the bolt connected to the mass element; wherein the first securing device has a collar that abuts against the spring device, the collar is configured as a stop on the fastening element, and the bolt does not extend through the collar; wherein each of the elastomeric shaped parts has a circumferentially extending edge section which is inserted into the opening of the fastening element, and the edge sections are in contact within the opening; and wherein the vibration absorber further includes a second elastic mount unit having a second securing device, the first securing device holds a different number of elastomeric shaped parts than the second securing device.

2. The vibration absorber according to claim 1, wherein the first securing device preloads the elastomeric shaped parts during assembly with the mass element.

3. The vibration absorber according to claim 1, wherein the elastomeric shaped parts are connected in a positive and/or non-positive form-locking and/or force-locking manner to the first securing device, the mass element and/or the fastening element.

4. The vibration absorber according to claim 1, wherein the elastomeric shaped parts of at least the first securing device are configured in a ring shape.

5. The vibration absorber according to claim 1, wherein the edge sections of the elastomeric shaped parts are inserted into the opening of the fastening element in a form-locking and/or force-locking manner.

6. The vibration absorber claim 1, wherein the vehicle part includes one of a gearbox, a tailgate, or a chassis.

7. The vibration absorber claim 1, wherein the bolt being connected to the mass element in a form-locking and/or force-locking manner.

8. The vibration absorber according to claim 7, wherein the bolt is provided with an external thread which is screwed into an internal thread of the mass element, or that the bolt is provided with a profiling which is inserted into a hole of the mass element.

9. The vibration absorber according to claim 1, wherein the fastening element is configured as a retaining plate.

10. The vibration absorber of claim 1, wherein the bolt includes a first section with a first diameter and a second section with a second diameter, wherein the first diameter is larger than the second diameter.

11. The vibration absorber of claim 10, wherein the first section extends through passages of the elastomeric shaped parts, the first section being connected in a form-locking and/or force-locking manner to the elastomeric shaped parts.

12. The vibration absorber of claim 10, wherein the first section extends through passages of the elastomeric shaped parts, and the first section accommodates the two elastomeric shaped parts in a form of a form-locking and/or force-locking manner.

13. The vibration absorber of claim 10, wherein the second section is pressed into a hole in the mass element.

14. The vibration absorber of claim 10, wherein the second section is screwed into a hole in the mass element.

15. The vibration absorber of claim 1, wherein the first securing device is T-shaped in cross-section.

16. The vibration absorber of claim 1, wherein the first securing device is a one-piece component.

17. The vibration absorber of claim 1, including a plurality of elastic mount units; and wherein the elastic mount units are arranged at equal distances from each other.

18. The vibration absorber of claim 1, including a plurality of elastic mount units; and wherein the elastic mount units are arranged at different distances from each other.

19. A vibration absorber for absorbing and/or damping vibrations of a vehicle part, comprising: at least one mass element, at least one fastening element for fastening the vibration absorber to the vehicle part, at least one spring device and a first securing device which captively connects the mass element and the fastening element to one another, wherein the spring device comprises two elastomeric shaped parts manufactured separately from the mass element and the fastening element; wherein the first securing device receives the elastomeric shaped parts to form ne a first elastic mount unit which elastically decouples the mass element from the fastening element; wherein the first securing device comprises a bolt which extends together with the elastomeric shaped parts through an opening of the fastening element, the bolt connected to the mass element; wherein each of the elastomeric shaped parts has a circumferentially extending edge section which is inserted into the opening of the fastening element, and the edge sections are in contact within the opening; and wherein the vibration absorber further includes a second elastic mount unit having a second securing device, the first securing device holds a different number of elastomeric shaped parts than the second securing device.

* * * * *

UNITED STATES PATENT AND TRADEMARK OFFICE
CERTIFICATE OF CORRECTION

PATENT NO. : 11,773,939 B2
APPLICATION NO. : 16/797332
DATED : October 3, 2023
INVENTOR(S) : Dominik Hugenschmidt et al.

Page 1 of 1

It is certified that error appears in the above-identified patent and that said Letters Patent is hereby corrected as shown below:

In the Claims

Column 8, Claim 19, Line 53, delete "ne".

Signed and Sealed this
Sixteenth Day of January, 2024

Katherine Kelly Vidal
*Director of the United States Patent and Trademark Office*